US009317151B2

United States Patent
Jamshidi-Roudbari et al.

(10) Patent No.: US 9,317,151 B2
(45) Date of Patent: Apr. 19, 2016

(54) LOW COMPLEXITY GATE LINE DRIVER CIRCUITRY

(71) Applicant: Apple Inc., Cupertino, CA (US)

(72) Inventors: Abbas Jamshidi-Roudbari, Sunnyvale, CA (US); Cheng-Ho Yu, Cupertino, CA (US); Shih Chang Chang, Cupertino, CA (US); Ting-Kuo Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 13/747,872

(22) Filed: Jan. 23, 2013

(65) Prior Publication Data

US 2013/0300681 A1  Nov. 14, 2013

Related U.S. Application Data (60) Provisional application No. 61/646,795, filed on May 14, 2012.

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 7,468,720 | B2 | 12/2008 | Kim |
| 7,639,226 | B2 | 12/2009 | Kim et al. |
| 2009/0128541 | A1* | 5/2009 | Tsai et al. ................... 345/213 |
| 2009/0207119 | A1 | 8/2009 | Han et al. |
| 2010/0238143 | A1* | 9/2010 | Liu et al. .................... 345/204 |
| 2011/0187677 | A1 | 8/2011 | Hotelling et al. |

OTHER PUBLICATIONS

Cristaldi, David J., et al., "Liquid Crystal Display Drivers", Techniques and Circuits, Springer Science+Business Media B.V. 2009, Softcover reprint of hardcover 1st Edition 2009, ISBN 978-481-8482-8, (Table of Contents, pp. vii-x; and pp. 189-235).

* cited by examiner

*Primary Examiner* — Christopher R Lamb
(74) *Attorney, Agent, or Firm* — Blakely, Sokoloff, Taylor & Zafman LLP (57) ABSTRACT

Gate driver circuitry that controls an array of display elements is described. The gate driver circuitry has gate drivers that apply a control pulse to each of a number of gate lines in sequence, from a previous gate line to a current gate line, during a frame interval in which the array of display elements is filled with pixel values. Each gate driver has a latch stage followed by an output stage. The output stage is coupled to drive a current gate line, and the latch stage is coupled to drive a) a first hold circuit that holds the current gate line at a predetermined voltage, and b) a second hold circuit that holds a previous gate line at a predetermined voltage. Other embodiments are also described and claimed.

14 Claims, 10 Drawing Sheets

LOW COMPLEXITY GATE LINE DRIVER CIRCUITRY

RELATED MATTERS

This applications claims the benefit of the earlier filing date of provisional application No. 61/646,795 filed May 14, 2012.

An embodiment of the invention is directed to the design of driver circuitry that is used for driving the gate lines of a display element array, such as an active matrix liquid crystal display (LCD) thin film transistor (TFT) array. Other embodiments are also described.

BACKGROUND

For many applications, and particularly in consumer electronics devices, the large and heavy cathode ray tube (CRT) has been replaced by a flat panel display type, such as a liquid crystal display (LCD), plasma, and organic light emitting diode (OLED). A flat panel display screen contains an array of display elements. Each display element is to receive a signal that represents the picture element (pixel) value to be displayed at that location of the screen. This pixel signal may be applied using a transistor that is coupled to and integrated with the display element. The transistor may act as a switch element. It has a carrier electrode that receives the pixel signal, and a control electrode that receives a gate signal. The gate signal may serve to modulate or turn on and turn off the transistor so as to selectively apply the pixel signal to the coupled display element.

Figure 1:
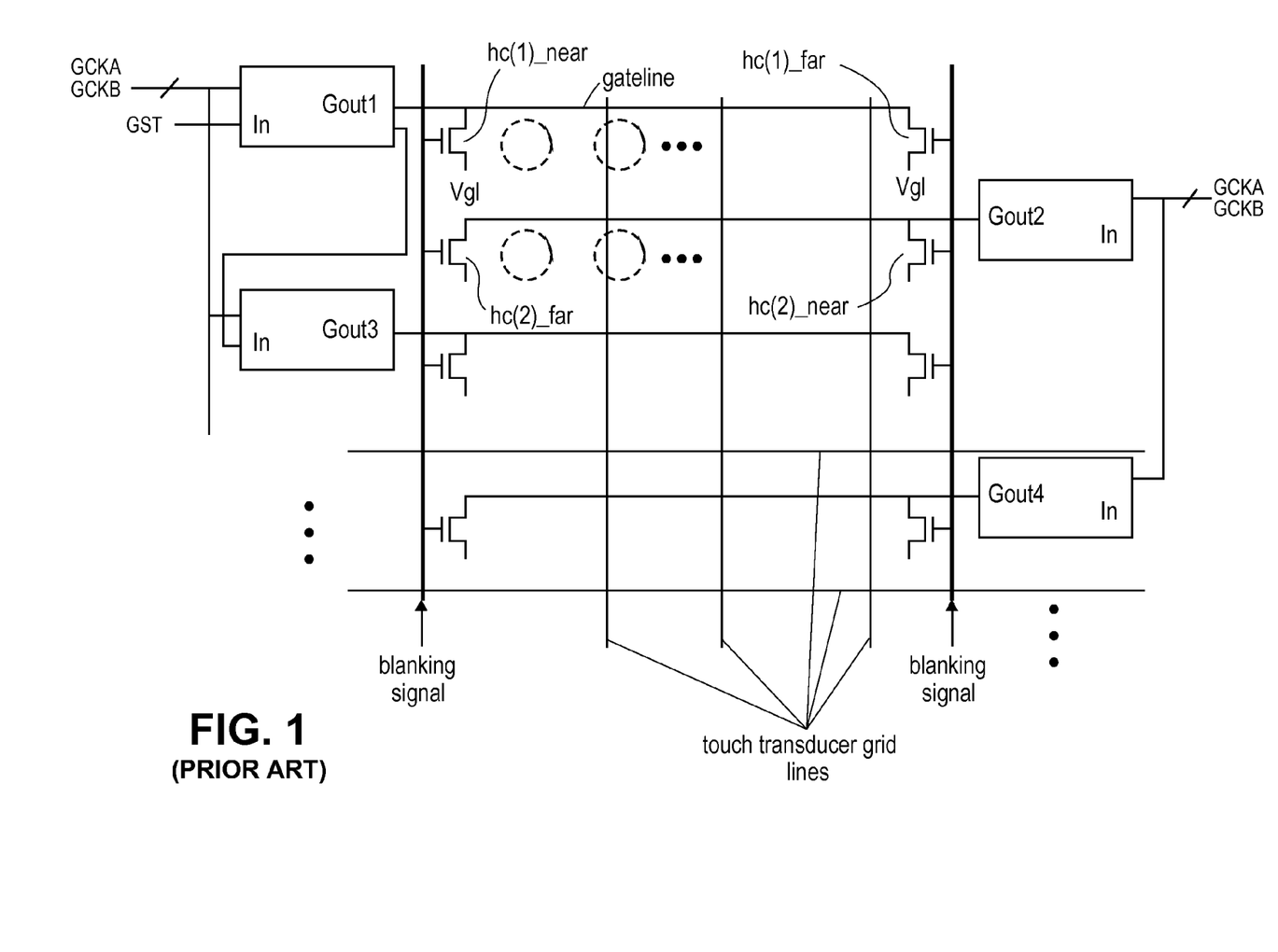
FIG. 1 is a diagram of gate driver circuitry for a display element array that is overlayed with touch transducer gridlines.

Typically, thousands or millions of copies of the display element and its associated switch element (e.g., an LCD cell and its associated control transistor) are produced in the form of an array, on a substrate such as a plane of glass or other light transparent material. The array is overlaid with a grid of data lines and gate lines. The data lines serve to deliver the pixel signals to the carrier electrodes of the control transistors, and the gate lines serve to apply the gate signals to the control electrodes of the transistors. In other words, each of the data lines is coupled to a respective group of display elements, typically referred to as a column of display elements, while each of the gate lines is coupled to a respective row of display elements. FIG. 1 shows an example of such an arrangement, where the circles in dotted lines represent the display elements (and the data lines and control transistors are not shown).

Although not shown, each data line is coupled to a data line driver circuit that receives control and pixel signals from a signal generator. The latter translates incoming pixel values (for example, red, green and blue pixel values) into data signals (with appropriate timing). The data line driver then performs the needed voltage level shifting to produce a pixel signal with the needed fan-out (current capability).

As to the gate lines, and as seen in FIG. 1, each gate line is coupled to a gate line driver (or simply "gate driver") having an output Gout. The gate driver receives clock (control) signals GCKA, GCKB from a signal generator (not shown). Each gate driver has a latch stage followed by an output stage that can force its respective gate line to one of two stable voltages in Gout, using an output stage that has a pull-up circuit and a pull-down circuit—see FIG. 2.

The array of display elements are, in most cases, driven in a horizontal or line-by-line scanning fashion: the desired pixel signals for a selected row of display elements are provided on the data lines while at the same time a selected row of display elements is "enabled" by a pulse that is asserted on the associated gate line, by the gate driver of that gate line. The approach is to scan line-by-line or row-by-row in a vertical direction, until the entire display element array has been "filled" with the pixel values of a single image frame. This process may need to be repeated many times per second, to refresh the pixel values in the array.

Figure 3:
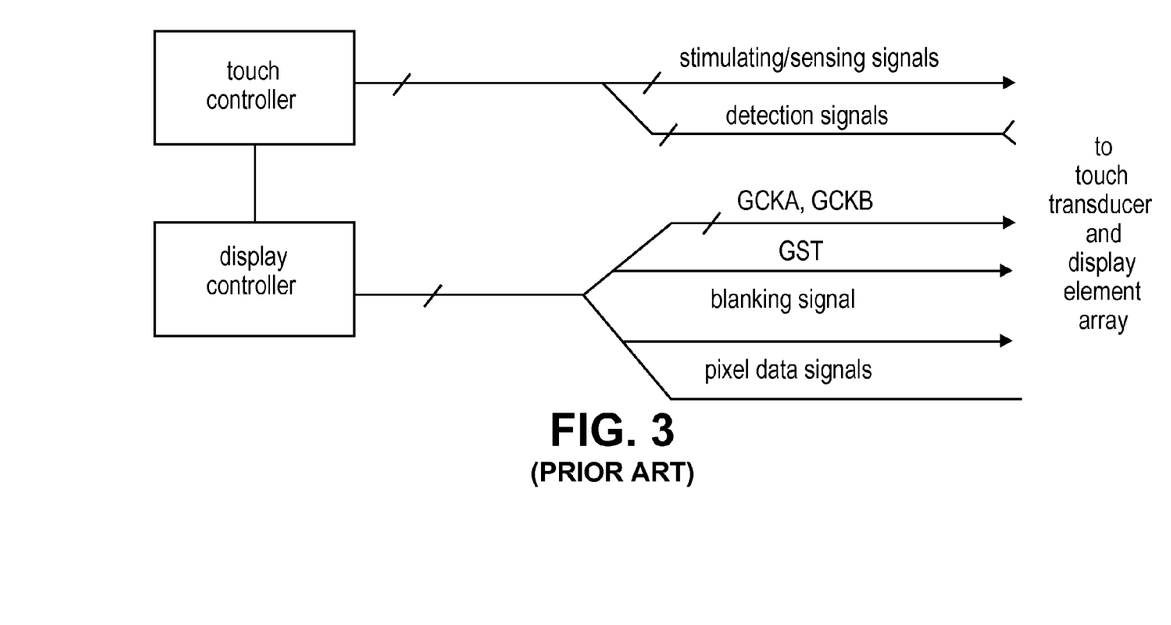
FIG. 3 is a block diagram of a touch controller and display controller that communicate with each other for a touch screen application, and certain signals that are produced or consumed by those controllers.

In some active matrix displays, the gate lines are connected to their respective gate drivers in an interlaced manner, i.e. the locations of the gate drivers alternate between the left and right sides of the display element array as shown in FIG. 1, e.g. the odd numbered lines are driven from the left while the even numbered ones are driven from the right. Also connected to each gate line is a respective pair of switch circuits hc(i)_near and hc(i)_far that together serve as a strong pull-down, to essentially hold the gate line at the level of Vgl; Vgl on a gate line is a voltage source that "disables" the display elements that are controlled by the gate line, thereby preventing pixel values from being loaded into the display elements. To achieve a strong (high current or low impedance) pull-down, the switch circuit hc(i)_near, hc(i)_far may include a relatively large transistor, which may be referred to as a gate line holding transistor. Typically, one column of holding transistors is located at the left side of the display element array as shown, and another column is located at the right side. The control electrodes of the transistors in each column are connected to a respective blanking control line; the two blanking control lines receive the same blanking signal, which is a control signal that is asserted by a display controller (see FIG. 3), during a "blanking interval" portion of a frame display interval. With a display element array that is overlaid with a proximity or touch transducer, forming for example a touch screen, the blanking interval can be used by a touch controller, to read the touch transducer during a "touch interval" portion of the blanking interval.

SUMMARY

In certain touch screen applications, for example in consumer electronics devices such as a smart phone and a tablet computer, the physical space that is available on a substrate for forming the display element array and touch transducer, and for routing their signal lines, is quite limited. It has been discovered that the lack of space may be particularly acute in the border regions of a touch screen, along the left and right sides between an edge of the display element array and an edge of the light transparent substrate (where the gate drivers are typically located, such as in the case of a gate driver-on-array display structure).

An embodiment of the invention is lower complexity gate driver circuitry that may free up some space on a substrate on which display elements to be controlled by gate driver circuitry are formed. The gate driver circuitry has gate drivers that apply a control pulse to each of a number of gate lines in a scanning sequence, from a previous gate line to a current gate line, during a frame interval in which the display elements are filled with pixel values. Each gate driver has a latch stage followed by an output stage. The output stage is coupled to drive a current gate line. The latch stage is coupled to drive a) a first hold circuit that holds the current gate line at a predetermined voltage, and b) a second hold circuit that holds a previous gate line at a predetermined voltage. Each hold circuit may be a pull-down, gate line holding transistor, such as a larger single TFT field effect device, that serves to maintain its associated gate line at a certain voltage. In some instances, such an arrangement may eliminate the need for routing a separate blanking control signal from a display controller or display driver integrated circuit, to each pair of pull-down holding transistors.

Figure 2:
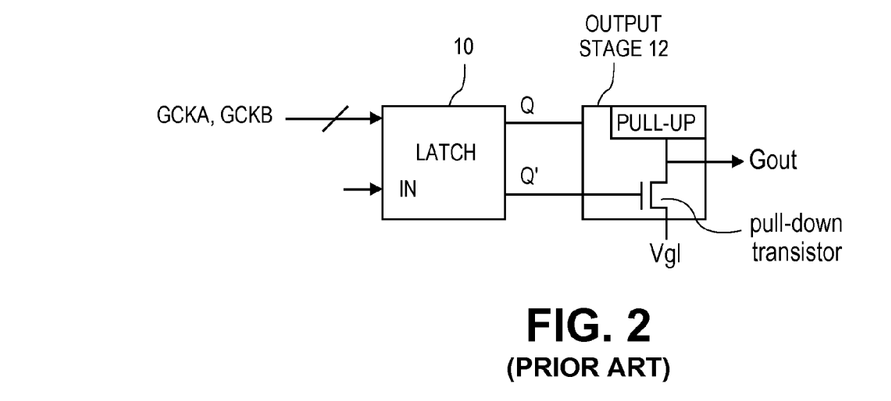
FIG. 2 is a detailed view of an example driver circuit.

An embodiment of the invention may also reduce the number of transistors in an output stage of the gate driver circuitry, in one instance by eliminating the separate pull-down transistor that is typically part of the output stage (see FIG. 2).

One or both of the above benefits may result in lower complexity gate driver circuitry which in turn reduces the complexity of a) routing signals between the display element array and a touch and/or display controller integrated circuit, and b) circuit layout in the border regions of the display element array. This in turn may lead to an advantageously narrower border region at the edge of the display panel or substrate.

The lower complexity gate driver circuitry may be useful in a touch screen application in which touch detection or touch transducer readout occurs during a touch interval (within the blanking interval). But the gate driver circuitry may also be useful in a display-only application.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 4:
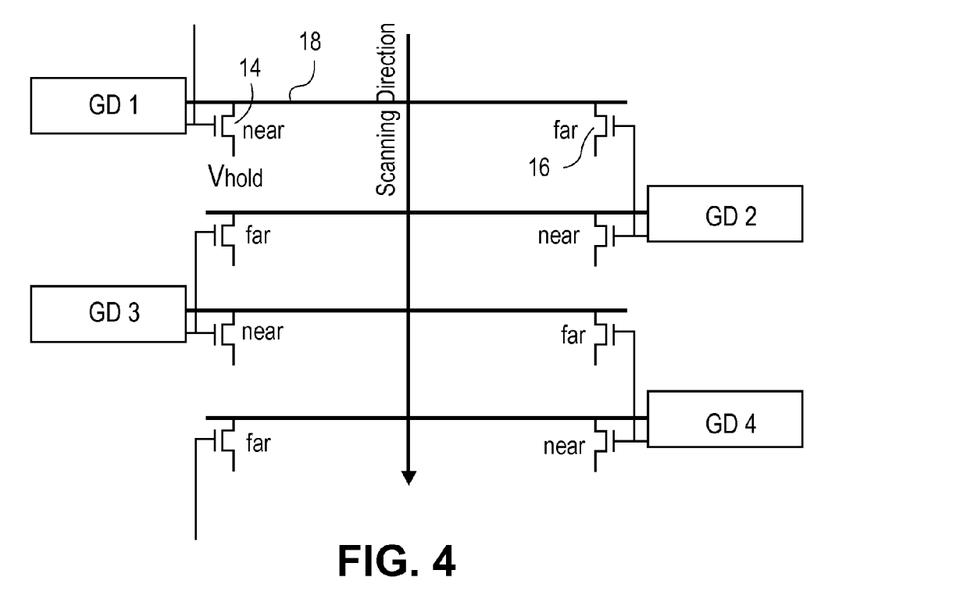
FIG. 4 is a diagram of gate line driver circuitry, in accordance with an embodiment of the invention.

Beginning with FIG. 4, an electronic device is depicted in which there are a number of gate lines 18 (four of which are actually shown), where each gate line 18 is coupled to be driven by its respective gate driver (GD). The gate lines 18 may be formed on a light passing substrate, e.g. a glass panel, suitable for also forming display elements on the panel. Each GD is coupled to drive a respective one of the gate lines 18. The gate drivers are for applying an output pulse to each of the gate lines in sequence, from a previous gate line to a current gate line, during a frame interval in which the array is filled with pixel values. In the particular example shown, the odd numbered gate lines are driven from the right while the even numbered ones are driven from the left, although that arrangement can be reversed.

For each gate line 18, there is a respective near hold circuit 14 and a respective far hold circuit 16 that is coupled to the gate line. In one embodiment, each hold circuit is a pull-down circuit that can maintain its gate line 18 at a low voltage. The hold circuits 14, 16 are depicted as single field effect transistors, and in particular N-type devices whose drain terminals are directly connected to the gate line 18 and whose source terminals are connected to a voltage source Vhold. As an alternative, a different type of transistor, or other active device, or perhaps a more complicated multi transistor hold circuit is possible. The hold circuit 14, 16 can hold its associated gate line 18 at a voltage that enables the display elements that are coupled to the gate line 18 (not shown) to essentially maintain their existing pixel values. The nomenclature "near" and "far" has been selected to indicate that the near hold circuit 14 is located closer to its associated driver GD1, than the far hold circuit 16. The above arrangement repeats for each gate line as shown.

Here, it should be noted that in some embodiments, there may be no need to have both the near hold circuit 14 and the far hold circuit 16, on each gate line. In one instance, only the near hold circuit 14 is sufficient, while in other instances, only the far hold circuit 16 is sufficient.

Still referring to FIG. 4, the gate drivers have been arranged in two groups, a first group that are coupled to drive their associated gate lines which are odd numbered (located at the left side), and a second group that are coupled to drive the even numbered gate lines (at the right side). Each group is arranged in a separate column, on the left or right side of the gate lines as shown. In such an arrangement, each of the gate drivers GD is further coupled to control both the respective near hold circuit 14 of its associated gate line, and the respective far hold circuit 16 of a neighbor gate line. As an example, it can be seen that the gate driver GD2 is coupled to control the near hold circuit 14 that is on its associated gate line, and the far hold circuit 16 of the gate line that is associated with GD1.

Figure 5:
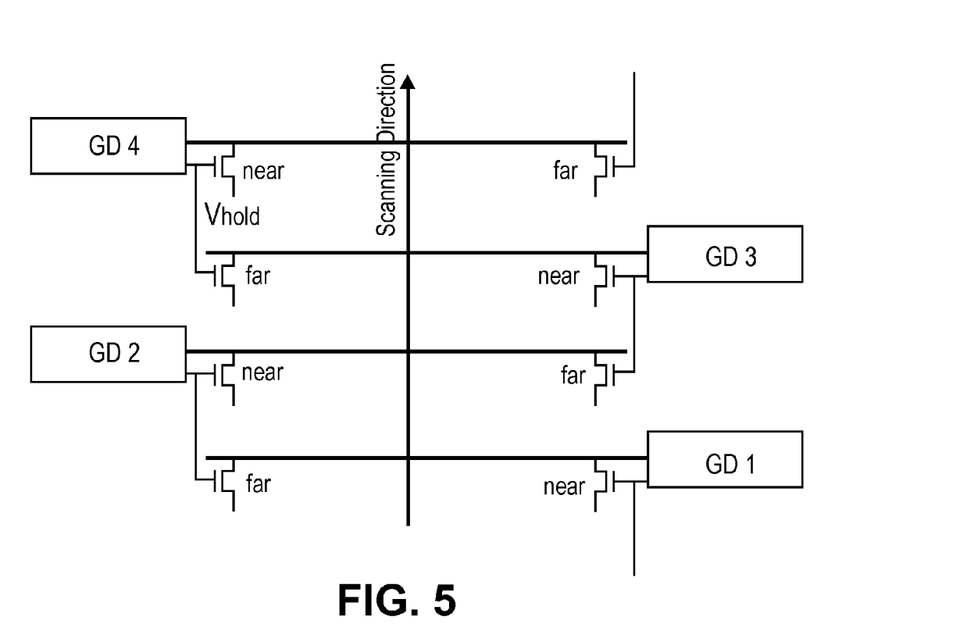
FIG. 5 is a block diagram of gate line driver circuitry for a group of display elements that are being scanned in a direction opposite to that of the embodiment of FIG. 4.

Note the scanning direction as shown, where the gate lines are pulsed in a vertical direction from top to bottom (sequentially numbered 1, 2, . . . ). This is in contrast to the embodiment of FIG. 5, where the scanning direction is reversed, that is from the bottom to the top. In that case, gate driver GD3 is coupled to control the near hold circuit 14 on its associated gate line, and is also coupled to control the far hold circuit 16 of the neighbor gate line being, in this case, the gate line associated with GD2. In both FIG. 4 and FIG. 5, the "neighbor gate line" can also be viewed as the gate line that is one or more gate lines "upstream" of the current or associated gate line.

Figure 6:
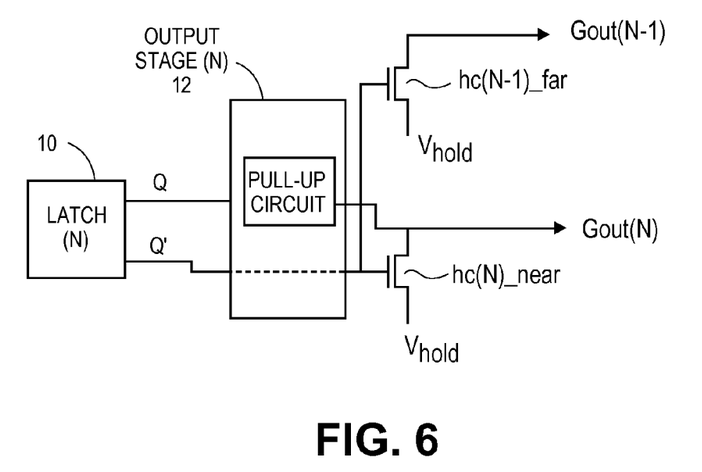
FIG. 6 shows lower complexity gate line driver circuitry, in accordance with another embodiment of the invention.

A close up view of an example gate driver, in accordance with an embodiment of the invention, is depicted in FIG. 6. As seen in this circuit schematic, the gate driver for gate line N is composed of a latch 10 that has inverting and non-inverting outputs Q, Q', followed by an output stage 12 that is coupled to drive the associated gate line with the signal Gout (N). In one instance, the output stage 12 has a pull-up circuit that is also under control of one or more clock control signals (not shown). Gout is driven to a sufficiently high voltage that, when held at that voltage, enables the display elements that are coupled to the associated gate line N to be updated with new pixel values. Note that the pull-up circuit is an example of a more general hold circuit which can drive and hold Gout to the desired voltage. A specific example of the output stage 12 is described further below in FIG. 10.

The gate driver circuitry depicted in FIG. 6 also drives the near hold circuit hc(N)_near of the associated gate line N, as well as the respective far hold circuit hc(N-1)_far of the neighbor gate line, gate line N-1. In this particular example, hc_near and hc_far is each a single gate line holding transistor that acts as a pull-down, to maintain the voltage at Gout at essentially the predetermined level of Vhold. This is achieved by connecting the control electrodes of those two transistors together, and driving them with the inverting output Q' of the latch 10. Note that as an alternative, the control signal applied to the control electrodes of hc_near and hc_far may be derived from the non-inverting output Q; in many instances, the inverting output Q' is readily available from a latch 10, and hence can advantageously be directly connected to control hc_near and hc_far.

As a result of this arrangement, it can be seen that the output stage 12 now has at least one fewer transistor, namely the pull-down transistor depicted in FIG. 2, while still being able to properly drive Gout to the desired higher and lower voltages. A timing diagram that helps explain why this circuit works is given and described below in connection with FIG. 9. At this point, it should also be recognized that with the gate driver circuitry arranged as in FIG. 6, there is no need for a separate conductive line that spans (in the vertical direction) the display element array (see FIG. 1), where this vertical signal line was used to receive the blanking signal. In addition, the circuit arrangement of FIG. 6 also enables the elimination of the other blanking signal control line (that is on the right side of the array), which further reduces the complexity of the overall control circuitry needed for driving the display element array.

Figure 7:
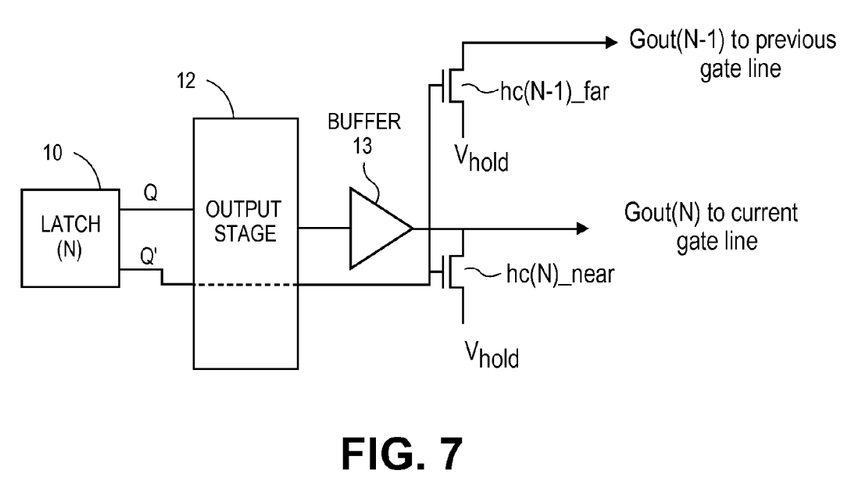
FIG. 7 shows lower complexity gate line driver circuitry that uses a buffer between an output stage and a gate line, that is suitable for a CMOS integrated circuit manufacturing process.

The arrangement in FIG. 6 is suitable for implementation in a digital logic integrated circuit fabrication process, where only N-type devices may be available. In the case where a CMOS fabrication process is required or is available, an arrangement as in FIG. 7 may alternatively be used. There, a buffer 13, which may be a single CMOS inverter stage, may be coupled between the output stage 12 and the associated gate line, to produce Gout. The arrangement of the circuitry and its operation may otherwise remain the same as in FIG. 6.

Figure 8:
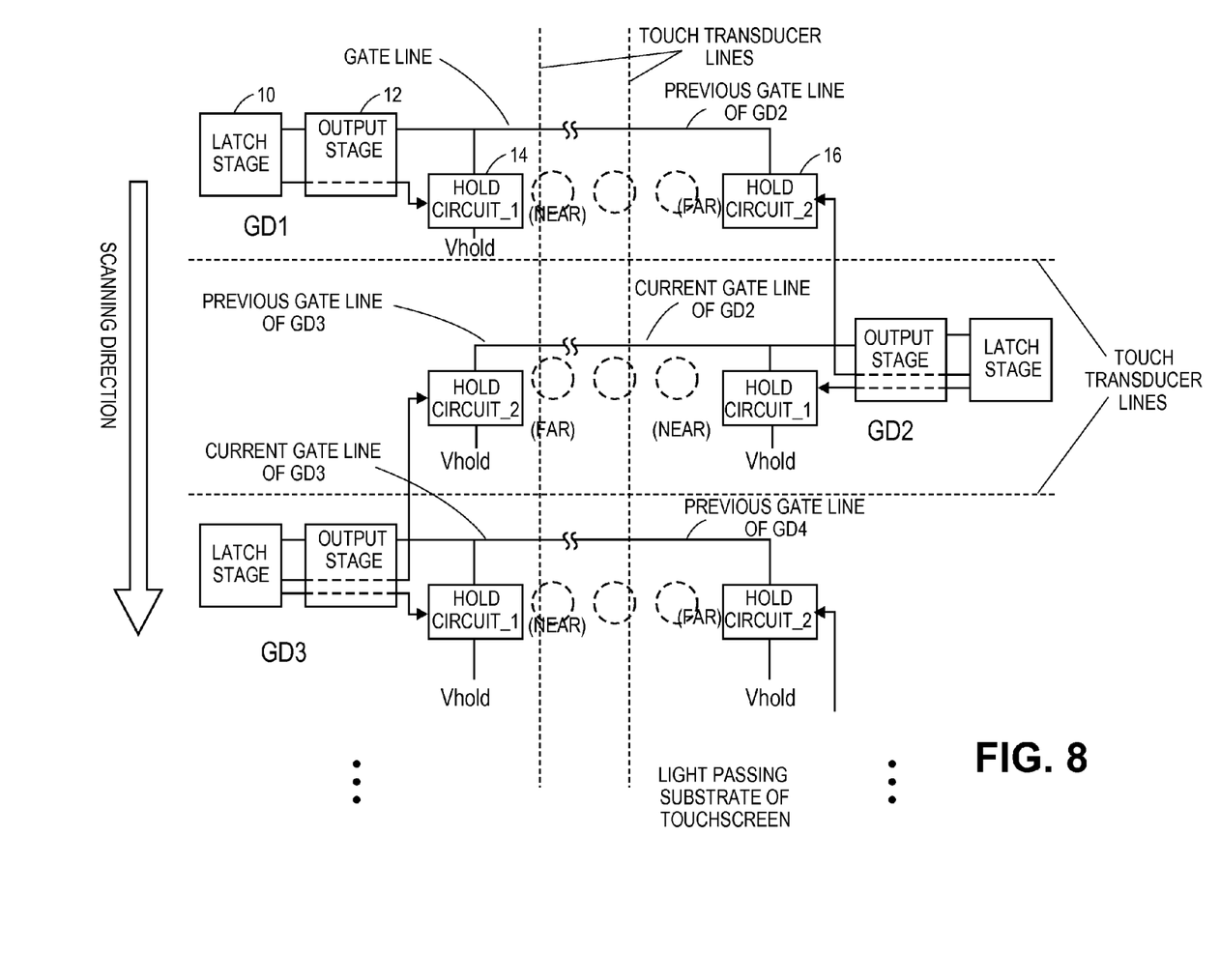
FIG. 8 shows lower complexity gate line driver circuitry, in accordance with an embodiment of the invention.

Turning now to FIG. 8, an electronic device is depicted according to another embodiment of the invention. This device may feature a touch screen system having a light passing substrate (e.g., a glass panel) on which display elements are formed (depicted as circles and dotted lines) together with a touch transducer. The latter may be a capacitive touch transducer. There are a number of gate lines as shown, and a corresponding number of gate drivers GD1, GD2, . . . Each gate driver has a latch stage 10 driving an output stage 12. The output stage 12 is coupled to drive a current gate line, while the latch stage is coupled to drive two hold circuits 14, 16, also referred to as first hold circuit_1 and second hold circuit_2. The first hold circuit holds the current gate line at a predetermined voltage, while the second hold circuit holds a previous gate line at a predetermined voltage. While not shown in FIG. 8, controller circuitry such as a combination of a touch and a display controller (see FIG. 3, for example) is coupled to the touch transducer and the gate drivers. The controller circuitry generates a start pulse that is fed to one of the gate drivers, and also generates other clock signals that are fed to each of the gate drivers. These control signals are used while updating the display elements during a display frame interval.

There may be sufficient parasitic elements such that there is an desired crosstalk signal and/or noise coupling between the touch transducer and the gate lines. For example, when the touch transducer is operating, noise may be induced onto a gate line and that makes its way across the touch transducer, where such noise may disturb readout from the touch transducer. An example of this may be in a capacitive sensing touch transducer that receives a stimulation signal or a sensing signal on its row line or its column line; in such cases, there may be a need to maintain a nearby gate line at a predetermined voltage, by a strong pull-down for instance, to reduce the risk of disturbances when reading the touch transducer. This may be achieved in the gate line driver circuitry, in accordance with an embodiment of the invention, as described below.

Figure 9:
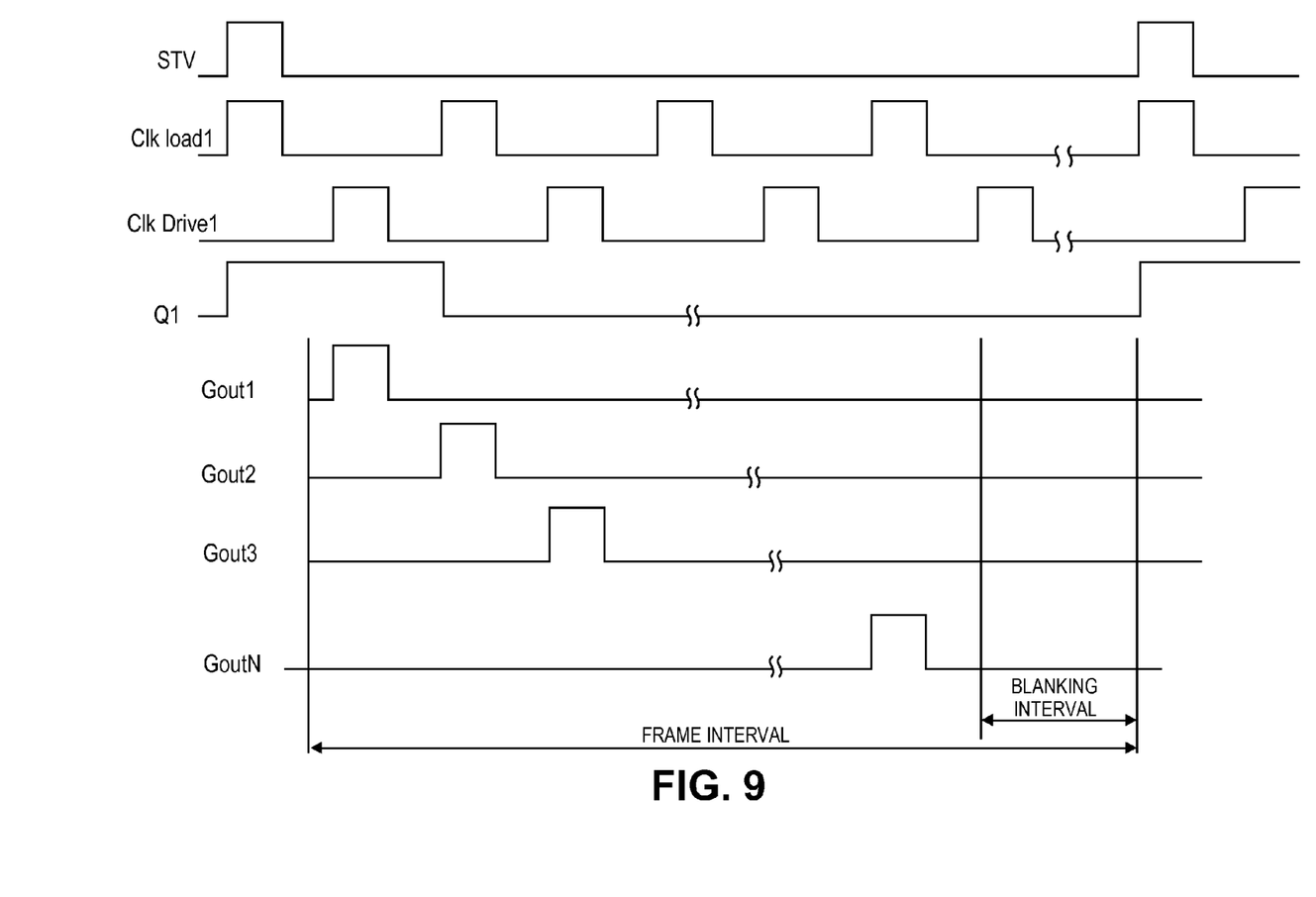
FIG. 9 illustrates example waveforms consumed by and produced by the gate line driver circuitry.

FIG. 9 shows an example timing diagram for relevant control signals in the gate line driver circuitry. A display frame interval is shown, defined between two consecutive start pulses STV. As an example, the frame interval may be about 6-7 msec long. At the end of the frame interval is a blanking interval which is used by the controller circuitry to read the touch transducer. During the blanking interval, all of the gate lines are held at a predetermined voltage that disables any updates to the display elements of the array, i.e. the active display area is not being addressed, so that the touch interval does not overlap with the display interval. Note that the circuit depicted in FIG. 8 does not use a separate blanking control signal in order to hold the gate lines at the predetermined voltage (during the blanking interval). Rather, the gate lines are held "low", as shown in the timing diagram of FIG. 5 where Gout1, Gout2, . . . GoutN are all in their low state during the blanking interval, due to the latch stage output. In other words, only the Q and/or Q' outputs of the latch stage 10 associated with each gate line are used to directly keep the current gate line and the previous gate line in their low states during the entire blank interval.

It should be noted that while the latch stage 10 may have both an inverting and non-inverting output, and the output stage 12 may be fed from the non-inverting output, while the inverting output may be used to drive the hold circuit_1 (14) and hold circuit_2 (16) of a previous gate line, a different circuit arrangement is possible that renders the same function of driving the hold circuits 14, 16. For instance, the latch stage 10 may actually generate two control signals of slightly different timing, one being routed to drive the hold circuit_1 of the current gate line and the other being routed to drive the hold circuit_2 of a previous gate line. A particularly efficient circuit for the gate driver circuitry, and in particular the output stage 12, is shown in FIG. 10.

Figure 10:
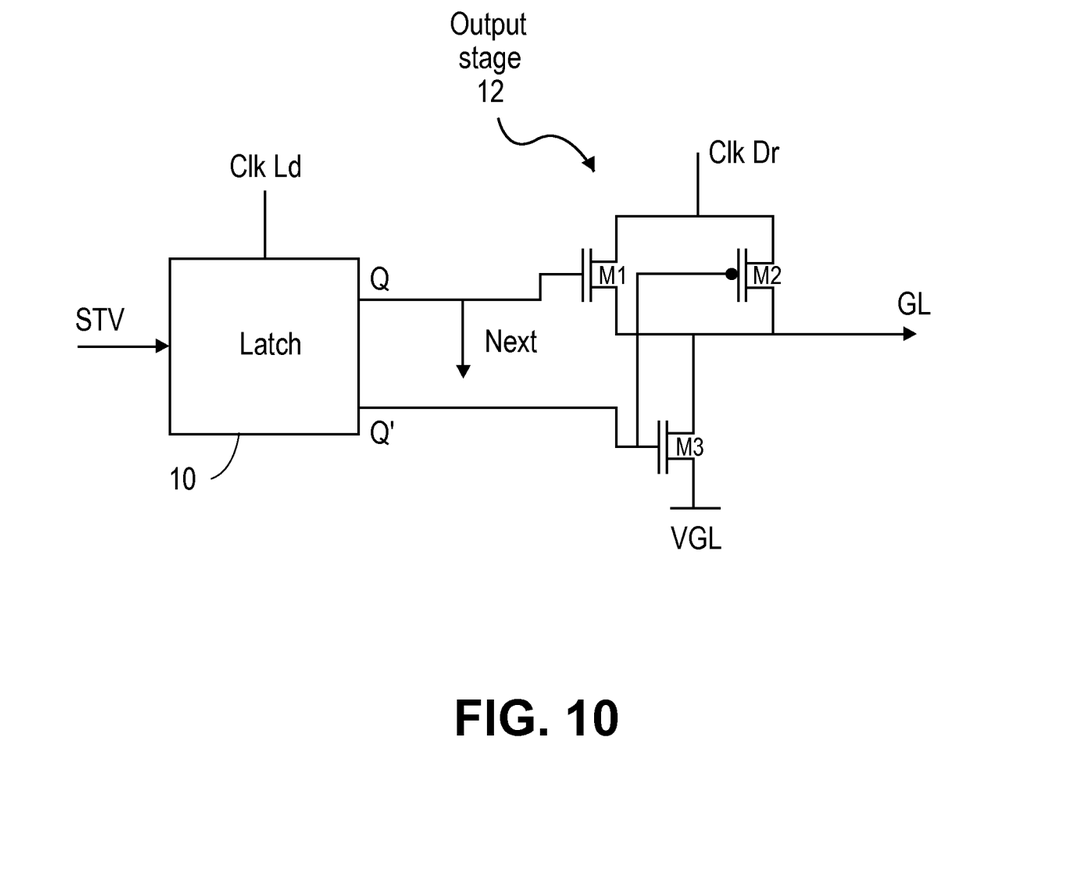
FIG. 10 is a close up view of gate line driver circuitry, in accordance with another embodiment of the invention.

Referring now to FIG. 10, this is a circuit schematic of an example gate line driver circuitry in which the output stage 12 has been implemented using a combination of N-type and P-type devices (such as would be available in a CMOS fabrication process). Operation of the circuit may be described as follows. The latch stage 10 receives a first input start pulse value STV, or alternatively may receive the first input value from a signal that is derived from an output of a previous gate driver (that is, a gate driver that is upstream in the scanning sequence). The latch stage 10 also receives a load clock (Clk load) which may be the same as or derived from one of the two input clock signals GCKA, GCKB that are typically used in controlling the gate drivers of a display element array. The output stage 12 receives a drive clock (Clk drive) which may be 180° out of phase with the load clock and that may be the same as or derived from another one of the clock inputs GCKA, GCKB.

As seen in the timing diagram of FIG. 9, when STV is asserted during assertion of clock load 1, the latch 10 captures the input value and its output Q is asserted as shown, while its complementary output Q' (not shown) is also asserted in the reverse direction. This causes transistors M1 and M2 to turn on, while M3 turns off. Next, upon assertion of clock drive 1, the output stage 12 responds by driving the gate line using the asserted Q output through transistor M1, which causes Gout1 to be asserted as shown. Note that Gout can be asserted because the pull-down transistor M3 remains turned off (due to Q' being low when clock driver 1 was asserted). In addition, Q' in this instance is also directly connected to the gate of a pull-up transistor M2 which is a P-type device whose source is directly connected to the load clock. When Q' is deasserted (goes high) upon the next assertion of the load clock, M1 and M2 are turned off thereby further helping maintain Gout at its low state. In addition, with Q' being high once the load clock pulse has passed, M3 remains turned on, thereby strongly maintaining Gout at essentially the desired Vgl level (here, a low voltage state) during the rest of the frame interval, as well as during the entire blanking interval. It should be noted that while M3 is shown together with the output stage 12 in FIG. 9, M3 is actually an example of the hold_circuit_1 in FIG. 8, and the near holding circuit 14 in FIG. 4, and is not, strictly speaking, part of the output stage 12.

Figure 11:
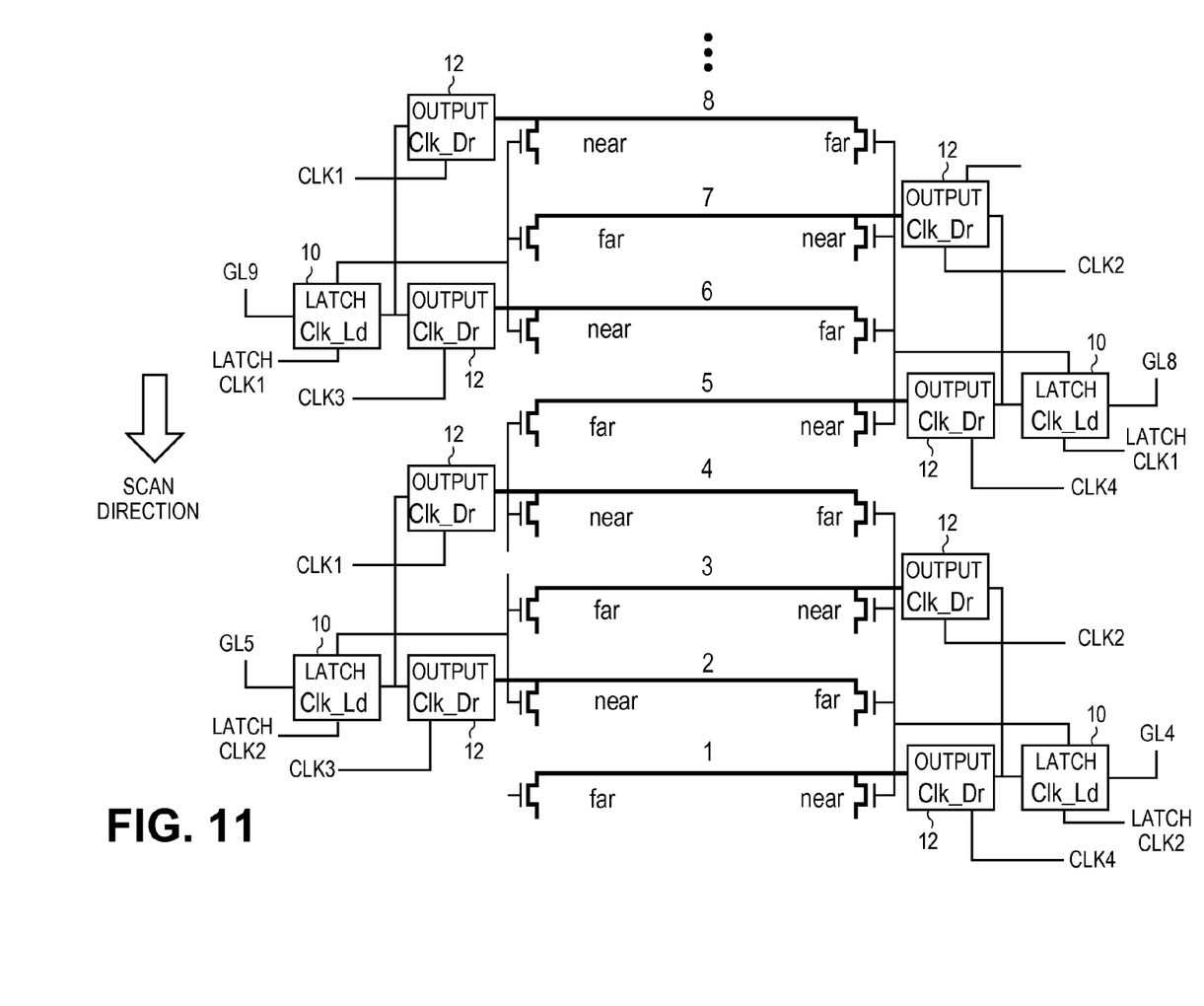
FIG. 11 shows lower complexity gate line driver circuitry in accordance with another embodiment of the invention.

Turning now to FIG. 11, a lower complexity gate line driver architecture is depicted in accordance with another embodiment of the invention. In contrast to the embodiment of FIG. 6 or FIG. 7 in which each gate line (having signal Gout) is driven by a respective output stage 12 in accordance with a respective latch stage 10, FIG. 11 shows an architecture in which two gate lines, in effect, share a single latch stage 10. For example, gate lines 2 and 4 are driven by their respective output stages 12, which in turn respond to the same latch signal output from the latch stage 10. Each gate driver now has a further output stage 12, which in one case may be driven in parallel with another output stage 12 by the same output signal from the shared latch stage 10. This is one way in which a single latch stage 10 can control two output stages 12 (which are coupled to drive respective gate lines), in addition to being able to control the hold circuits for those respective gate lines. This arrangement can be duplicated on both sides as shown in FIG. 11.

Still referring to FIG. 11, note how the latch stage 10 at the lower left is coupled to drive two gate lines (gate line 2 and gate line 4), but that it is also coupled to drive the hold circuits of four gate lines, namely gate lines 2-5 (using the same signal from the latch stage 10). Similarly, on the other side of the gate lines, that is on the lower right of the drawing, another latch 10 is coupled to control two output stages 12 (coupled to drive gate lines 1 and 3) and four hold circuits (gate lines 1-4). It should be clear that the gate drivers located on the right side are responsible for driving the odd numbered gate lines, while those on the left side drive the even number gate lines.

Figure 12:
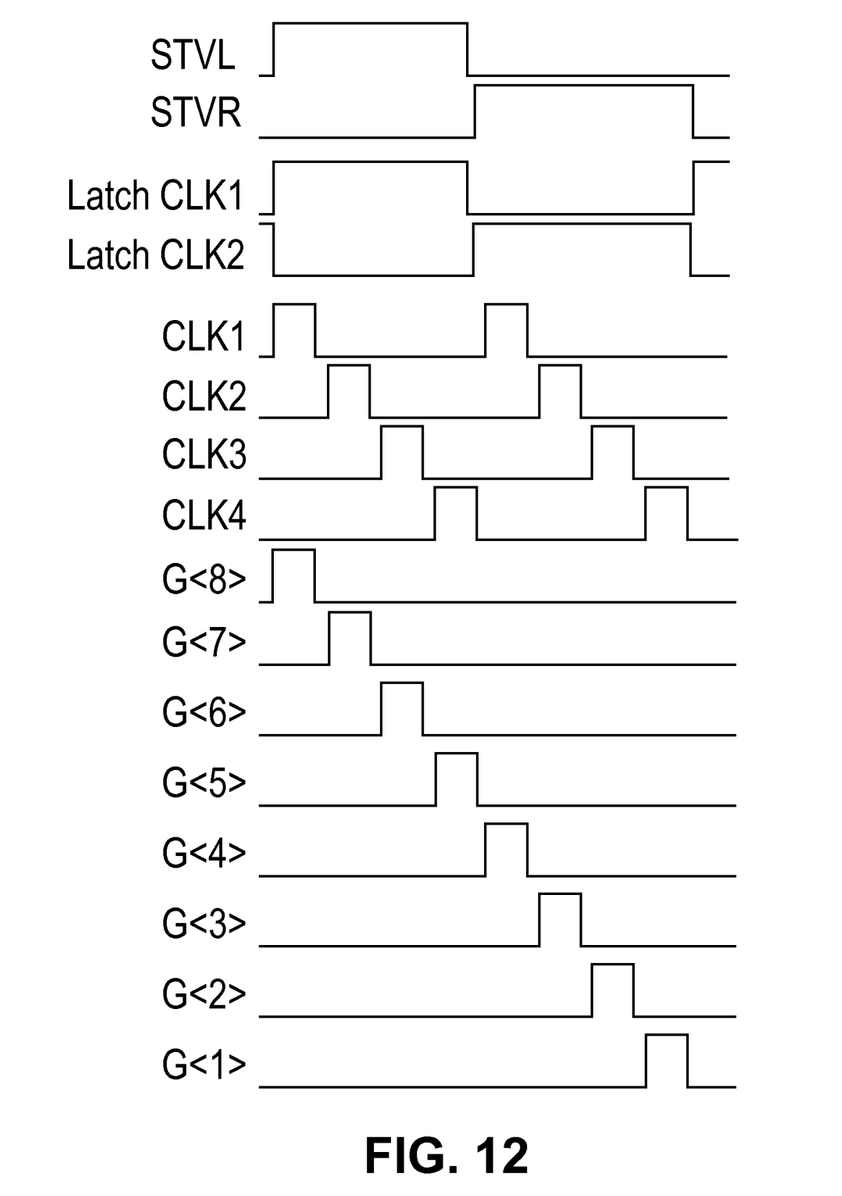
FIG. 12 illustrates example waveforms used by and produced by the circuitry of FIG. 11.
Figure 13A:
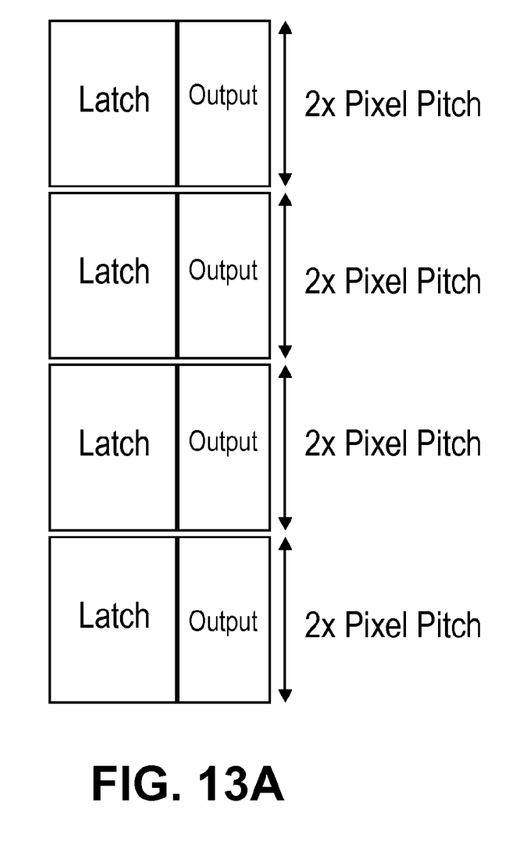
FIGS. 13A and 13B show how chip real-estate in the border region of a display system panel can be taken up by gate driver circuitry (although not to scale).
Figure 13B:
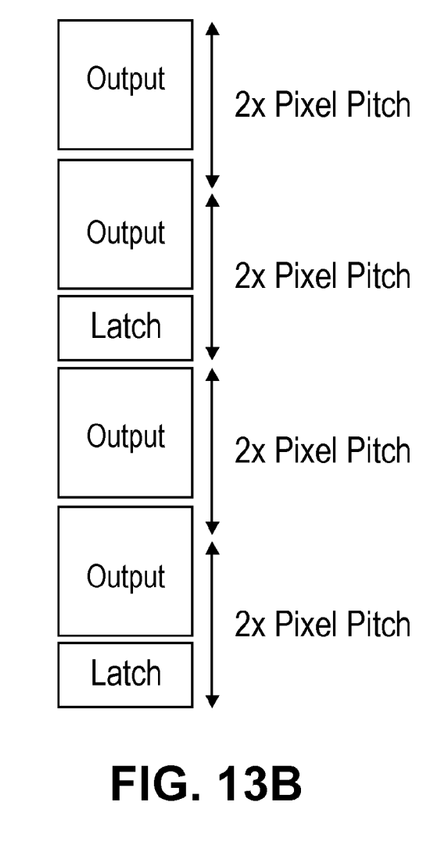

An example set of waveforms including four clock signals, CLK1-CLK4, that may be needed to drive the clock drive inputs of the output stages 12, of the architecture in FIG. 11, is shown in FIG. 12. Note that while the scan direction in FIG. 11 is downward, an alternative is to scan in the upward direction (by appropriately timing the clock waveforms). Referring to FIG. 12, this arrangement of the four clocks, CLK1-CLK4, and the two latch clocks, LATCH CLK2 and LATCH CLK2, may enable the scanning of the gate lines, for example, beginning with the signal on gate line 8 (G<8>) being asserted as a pulse in accordance with the pulse in CLK1, and then some time later gate line 7 or G<7>being asserted in accordance with the pulse in CLK2, etc. Thus, in contrast to the embodiment of FIG. 4 and FIG. 5 where a pair of clock signals, namely Clk load 1 and Clk drive 1 (see FIG. 9) may be sufficient to achieve scanning of the gate lines, the embodiment of FIG. 11 uses four clock signals, CLK1-CLK4, and two latch clock signals, LATCH CLK1 and LATCH CLK2. Despite the need for the additional clock signal lines (to be routed from a display driver integrated circuit, not shown, to the gate driver circuitry, namely the latch 10 and output stage 12 for each one), the arrangement in FIG. 11 helps reduce the width of the boarder region around the active display element area, by reducing the number of transistors needed for implementing the gate drivers. This reduction in the needed horizontal space in the boarder region is illustrated in FIG. 13A and FIG. 13B, where the former roughly depicts the space occupied by a separate latch and a separate output stage for each gate driver (assigned to a respective gate line). The reduction in width can be seen in FIG. 13B, where one latch stage has been in effect eliminated from every two gate drivers of FIG. 13A, which practically speaking allows the two output stages that are associated with a shared latch stage to be laid out in a manner that takes up less space in the horizontal direction.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although most of the transistors depicted in the drawings are N-type field effect devices, the circuitry may be modified to instead use P-type devices in certain situations, e.g. when a CMOS fabrication process is available or required. Also, while the gate line pulses are said to be asserted sequentially, the actual pulses on two adjacent gate lines may have some time overlap. The description is thus to be regarded as illustrative instead of limiting.

What is claimed is:
1. An electronic device comprising:
a plurality of gate lines; and
a plurality of gate drivers each having a latch stage followed by an output stage, the output stage being coupled to drive a current gate line, and wherein the gate driver is coupled to drive a) a first hold circuit that holds the current gate line at a predetermined voltage, and b) a second hold circuit that holds a previous gate line at a predetermined voltage, and wherein each gate driver further comprises another output stage that is controlled by the latch stage and is coupled to drive another gate line.

2. The electronic device of claim 1 further comprising a plurality of display elements arranged as an array, and the gate drivers are arranged a) from top to bottom of the array in sequential scan order and b) alternating between left and right of the array.

3. The electronic device of claim 2 further comprising:
a touch transducer that overlays the display element array; and
a touch controller to generate a stimulation or sensing signal in the touch transducer.

4. The electronic device of claim 2 further comprising a light passing substrate on which the array of display elements, the gate lines and the gate line driver circuitry are formed.

5. The electronic device of any claim 1 wherein constituent transistors of the latch stage, the output stage and the first and second hold circuits are thin film transistors.

6. The electronic device of claim 1 wherein the output stage comprises a pull-up circuit that can hold the current gate line at a voltage that enables display elements coupled to the current gate line to be updated with new pixel values,
and wherein the first hold circuit can hold the current gate line at a voltage that enables the display elements that are coupled to the current gate line to essentially maintain existing pixel values.

7. The electronic device of claim 5 wherein each of the first and second hold circuits comprises a pull-down transistor that is larger than every one of the constituent transistors of the output stage and the latch stage.

8. An electronic device comprising:
a plurality of gate lines, with a respective near hold circuit and a respective far hold circuit coupled to each of the gate lines;
a first plurality of gate drivers each of the first plurality of gate drivers being coupled to drive an associated odd numbered one of the gate lines, when the gate lines are numbered sequentially; and
a second plurality of gate drivers each of the second plurality of gate drivers being coupled to drive an associated even numbered one of the gate lines,
wherein for each gate line, the respective near hold circuit is located closer to an associated gate driver, that is coupled to drive the gate line, than the respective far hold circuit,
and wherein each of the gate drivers is further coupled to control a) the respective near hold circuit of an associated gate line and b) the respective far hold circuit of a neighbor gate line, and wherein each of the second plurality of gate drivers has two output stages that are controlled by the same latch stage and that are coupled to drive a respective pair of the associated even numbered gate lines.

9. The device of claim 8 wherein each of the first plurality of gate drivers has a latch stage with inverting and non-inverting outputs, and an output stage that is coupled to drive the associated gate line,
wherein the inverting output of the latch stage is directly connected to drive the respective near hold circuit of the associated gate line and the respective far hold circuit of the neighbor gate line.

10. The device of claim 9 wherein the output stage in each of the first plurality of gate drivers comprises a hold circuit that can hold the associated gate line at a voltage that enables display elements that are coupled to the associated gate line to be updated with new pixel values,
and wherein the respective near hold circuit can hold the associated gate line at a voltage that enables the display elements that are coupled to the associated gate line to essentially maintain existing pixel values.

11. The device of claim 8 wherein the first plurality of gate drivers are arranged in a column on one side of the gate lines, and the second plurality of gate driers are arranged on another side of the gate lines.

12. The device of claim 8 wherein each of the first plurality of gate drivers has two output stages that are controlled by the same latch stage and that are coupled to drive a respective pair of the associated odd numbered gate lines.

13. An electronic device comprising:
a touchscreen system having
a plurality of display elements,
a touch transducer,
a plurality of gate lines coupled to the display elements,
a plurality of gate drivers each having a latch stage driving an output stage, the output stage being coupled to drive a current gate line, wherein each gate driver further comprises another output stage that is controlled by the latch stage and is coupled to drive another gate line, and the latch stage being coupled to drive a) a first hold circuit that holds the current gate line at a predetermined voltage, and b) a second hold circuit that holds a previous gate line at a predetermined voltage, and
controller circuitry that is coupled to the touch transducer and the gate drivers, the controller circuitry to generate a) a start pulse that is fed to one of the gate drivers and b) a plurality of clock signals that are fed to each of the gate drivers, when updating the display elements during a frame interval, the controller circuitry to read the touch transducer during a blanking interval in which the latch stage directly maintains gate electrodes of the first and second hold circuits at a fixed voltage without using a separate blanking control signal to directly control the gate electrodes, so as to hold the gate lines at the predetermined voltage.

14. The device of claim 13 wherein the latch stage has inverting and non-inverting outputs, the output stage being fed from the non-inverting output, and the inverting output is to drive the first hold circuit and the second hold circuit.

* * * * *